United States Patent
Shioiri (10) Patent No.: US 12,285,958 B2
(45) Date of Patent: Apr. 29, 2025

(54) PRINTING APPARATUS, PRINTING METHOD, AND STORAGE MEDIUM

(71) Applicant: CANON KABUSHIKI KAISHA, Tokyo (JP)

(72) Inventor: Hiroyuki Shioiri, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 174 days.

(21) Appl. No.: 17/988,109

(22) Filed: Nov. 16, 2022

(65) Prior Publication Data

US 2023/0182481 A1   Jun. 15, 2023

(30) Foreign Application Priority Data

Dec. 14, 2021   (JP) .................................. 2021-202432

(51) Int. Cl.
*B41J 2/21*   (2006.01)
*G06F 3/12*   (2006.01)

(52) U.S. Cl.
CPC ........... *B41J 2/2132* (2013.01); *B41J 2/2103* (2013.01); *G06F 3/1224* (2013.01); *G06F 3/1239* (2013.01)

(58) Field of Classification Search
CPC ..... B41J 2/2132; B41J 2/2103; G06F 3/1224; G06F 3/1239
See application file for complete search history.

(56) References Cited

FOREIGN PATENT DOCUMENTS

JP   2016-193592 A   11/2016

*Primary Examiner* — Justin Seo
(74) *Attorney, Agent, or Firm* — VENABLE LLP (57) ABSTRACT

A printing apparatus to which a consumable part filled with a printing material can be detachably attached, so as to perform printing according to a color mode setting by use of the printing material filled in the consumable part whose type differs according to a contract, includes: a setting unit configured to set a contract status, based on information related to the contract; a first obtainment unit configured to obtain a set color mode; a second obtainment unit configured to obtain the type of mounted consumable part which corresponds to the contract status; and a print control unit configured to control printing by allowing or restricting the printing, based on the contract status that is set by the setting unit, the color mode that is obtained by the first obtainment unit, and the type of consumable part that is obtained by the second obtainment unit.

15 Claims, 9 Drawing Sheets

| CONTRACT START DATE AND TIME / CONTRACT END DATE AND TIME | FUTURE | PAST | UNDECIDED |
|---|---|---|---|
| FUTURE | OUTSIDE FLAT-RATE PERIOD | OUTSIDE FLAT-RATE PERIOD | OUTSIDE FLAT-RATE PERIOD |
| PAST | WITHIN FLAT-RATE PERIOD | OUTSIDE FLAT-RATE PERIOD | WITHIN FLAT-RATE PERIOD |
| UNDECIDED | OUTSIDE FLAT-RATE PERIOD | OUTSIDE FLAT-RATE PERIOD | OUTSIDE FLAT-RATE PERIOD |

PRINTING APPARATUS, PRINTING METHOD, AND STORAGE MEDIUM

BACKGROUND

Field

The present disclosure relates to a printing apparatus, printing method, and storage medium for performing printing by use of a printing material.

Description of the Related Art

In a printing apparatus that performs printing by use of a printing material such as ink, a flat-rate service is provided according to a contract, for example. A flat-rate service is a service in which the user pays a flat-rate fee in every predetermined time period so that the user can receive a consumable part such as a toner cartridge and an ink tank filled with a printing material without paying a cost for the consumable part. Note that, in a case where such a flat-rate service is not provided, the user pays the cost for the consumable part to purchase the consumable part each time.

Therefore, in such a printing apparatus, depending on the contract, the contract status switches between a flat-rate status in which a flat-rate service is provided and a non-flat-rate status in which flat-rate services are not provided. Japanese Patent Laid-Open No. 2016-193592 discloses a technology for determining whether or not printing can be performed according to the mounting status of a consumable part and the contract status.

However, with the technology disclosed in Japanese Patent Laid-Open No. 2016-193592, if the contract status is switched from a flat-rate status to a non-flat-rate status, it has been required that a consumable part corresponding to the flat-rate status is replaced with a general-purpose consumable part to be used in the non-flat-rate status. As a result, there has been a possibility that the user's operation load increases.

SUMMARY

The present disclosure has been made in view of the above-described problem, so as to provide a technology capable of reducing the burden on the user.

In the first aspect of the present disclosure, there is provided a printing apparatus to which a consumable part filled with a printing material can be detachably attached, so as to perform printing according to a color mode setting by use of the printing material filled in the consumable part whose type differs according to a contract, the printing apparatus including:
- a setting unit configured to set a contract status, based on information related to the contract;
- a first obtainment unit configured to obtain a set color mode;
- a second obtainment unit configured to obtain the type of mounted consumable part which corresponds to the contract status; and
- a print control unit configured to control printing by allowing or restricting the printing, based on the contract status that is set by the setting unit, the color mode that is obtained by the first obtainment unit, and the type of consumable part that is obtained by the second obtainment unit.

In the second aspect of the present disclosure, there is provided a printing method of a printing apparatus to which a consumable part filled with a printing material can be detachably attached, so as to perform printing according to a color mode setting by use of the printing material filled in the consumable part whose type differs according to a contract, the printing method including:
- setting a contract status, based on information related to the contract;
- obtaining a set color mode;
- obtaining the type of mounted consumable part which corresponds to the contract status; and
- allowing or restricting the printing, based on the set contract status, the obtained color mode, and the obtained type of consumable part.

In the third aspect of the present disclosure, there is provided a non-transitory computer readable storage medium storing a program for causing a computer to perform a printing method in which a consumable part filled with a printing material can be detachably attached, so as to perform printing according to a color mode setting by use of the printing material filled in the consumable part whose type differs according to a contract, the printing method including:
- setting a contract status, based on information related to the contract;
- obtaining a set color mode;
- obtaining the type of mounted consumable part which corresponds to the contract status; and
- allowing or restricting the printing, based on the set contract status, the obtained color mode, and the obtained type of consumable part.

According to the present disclosure, it is possible to reduce the burden on the user.

Further features of the present disclosure will become apparent from the following description of exemplary embodiments with reference to the attached drawings.

DESCRIPTION OF THE EMBODIMENTS

Hereinafter, with reference to the accompanying drawings, detailed explanations are given of examples of an embodiment of a printing apparatus, a printing method, and a storage medium. Note that it is not intended that the following embodiments limit the present disclosure, and every combination of the characteristics explained in the present embodiments is not necessarily essential to the solution in the present disclosure. Further, the positions, shapes, etc., of the constituent elements described in the embodiments are merely examples and are not intended to limit this disclosure to the range of the examples.

First Embodiment

Figure 1:
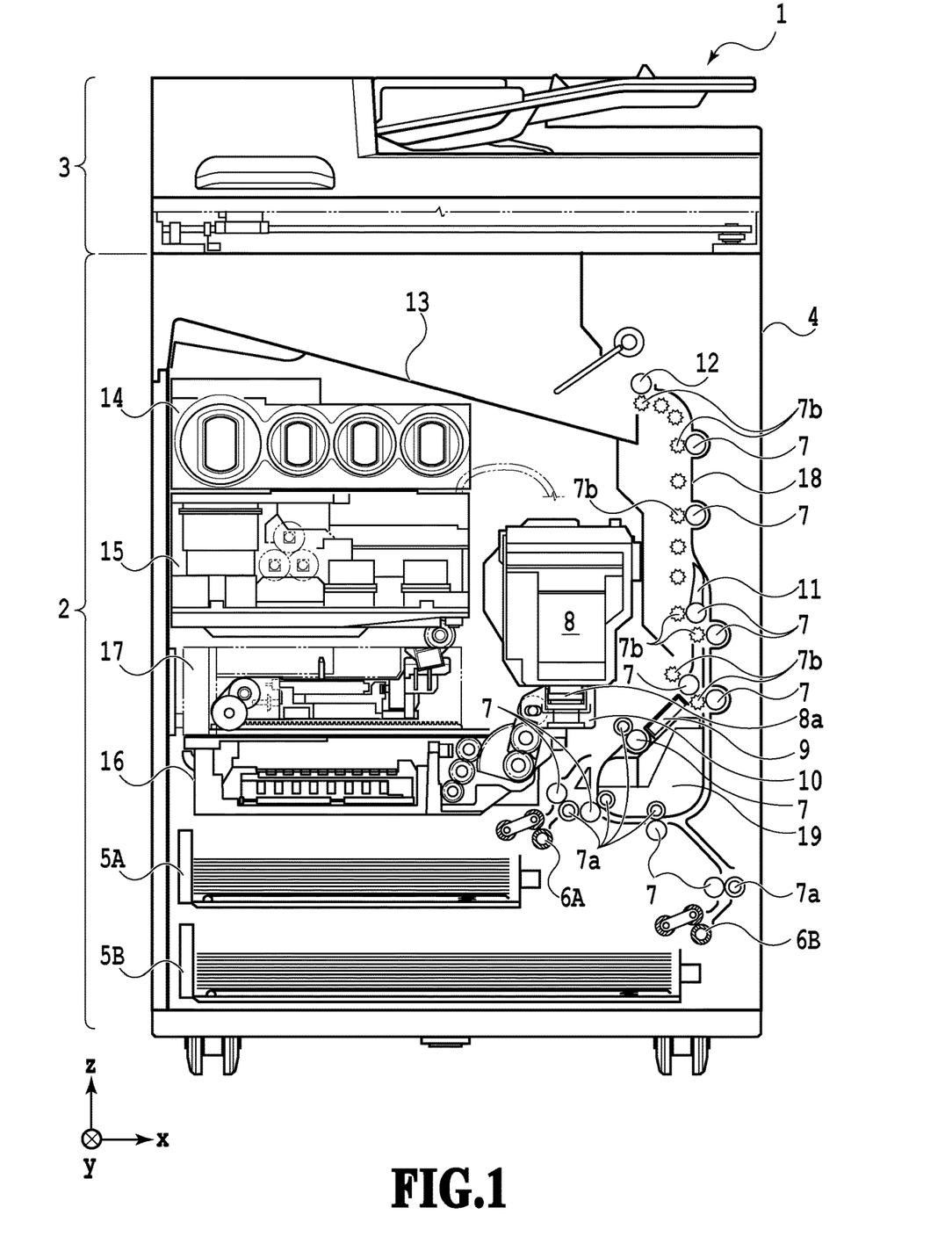
FIG. 1 is an internal configuration diagram of a printing apparatus.

FIG. 1 is an internal configuration diagram of the inkjet printing apparatus 1 (hereinafter referred to as the printing apparatus 1) used in the present embodiment. In the drawings, x-direction is the horizontal direction, y-direction (the direction perpendicular to the paper plane) is the direction in which an array of ejection ports is arranged in the later-described print head 8, and z-direction is the vertical direction.

The printing apparatus 1 is a multifunctional peripheral including the print part 2 and the scanner part 3. The printing apparatus 1 is capable of executing various processes related to a printing operation and a reading operation with the print part 2 and the scanner part 3 moving separately or moving together. The scanner part 3 includes an automatic document feeder (ADF) and a flatbed scanner (FBS). The scanner part 3 is capable of reading a document automatically fed by the ADF and reading (scanning) a document placed on a platen glass of the FBS by the user. Note that, although the printing apparatus 1 of the present embodiment is a multifunctional peripheral including both of the print part 2 and the scanner part 3, such a form in which the scanner part 3 is not included is possible as well. FIG. 1 is a diagram illustrating the printing apparatus 1 being in a standby status, in which neither a printing operation nor a reading operation is performed.

In the print part 2, the first cassette 5A and the second cassette 5B for accommodating the print medium (cut sheet) S are detachably installed at the bottom of the casing 4 in the vertical direction. A relatively small print medium of up to A4 size is stacked and accommodated in the first cassette 5A and a relatively large print medium of up to A3 size is stacked and accommodated in the second cassette 5B. Near the first cassette 5A, the first feeding unit 6A for separately feeding each of the accommodated print media is installed. Similarly, near the second cassette 5B, the second feeding unit 6B is installed. In a case where a printing operation is performed, the print medium S is selectively fed from either one of the cassettes.

The conveyance rollers 7, the discharging rollers 12, the pinch rollers 7a, the spurs 7b, the guide 18, the inner guide 19, and the flapper 11 are conveyance mechanisms for guiding the print medium S in a predetermined direction. The conveyance rollers 7 are drive rollers disposed on the upstream side and on the downstream side relative to the print head 8 (platen 9) and driven by a conveyance motor, which is not illustrated in the drawings. The pinch rollers 7a are follower rollers that rotate while nipping the print medium S together with the conveyance rollers 7. The discharging rollers 12 are drive rollers disposed on the downstream side relative to the conveyance rollers 7 and driven by a discharging motor, which is not illustrated in the drawings. The spurs 7b pinch and convey the print medium S together with the discharging rollers 12 and the conveyance rollers 7 disposed on the downstream side relative to the print head 8 (platen 9).

The guide 18 is disposed in the conveyance path of the print medium S so as to guide the print medium S in a predetermined direction. The inner guide 19 is a member extending in y-direction, which has a curved side surface so as to guide the print medium S along the side surface. The flapper 11 is a member for switching directions in which the print medium S is conveyed in a double-sided printing operation. The discharging tray 13 is a tray for stacking/holding the print medium S discharged by the discharging rollers 12 after a printing operation is completed.

The print head 8 of the present embodiment is a full-line type color inkjet print head, and multiple arrays of ejection ports for ejecting ink according to print data are arranged along y-direction of FIG. 1 so as to correspond to widths of print media S. In a case where the print head 8 is in a standby position, the ejection port surface 8a of the print head 8 is capped with the cap unit 10 as illustrated in FIG. 1. In a case where a printing operation is performed, the orientation of the print head 8 is changed by the later-described print controller 202 such that the ejection port surface 8a faces the platen 9. The platen 9 is configured with a flat plate extending in y-direction, so as to support the print medium S, on which a printing operation is performed by the print head 8, from the back side thereof.

The ink tank unit 14 is configured with the detachably-installed ink tank 224 (see FIG. 2) that is filled with ink to be supplied to the print head 8. In the present embodiment, the four ink tanks 224 storing inks of colors different from each other are mounted in the ink tank unit 14. Specifically, an ink tank storing cyan (C) ink, an ink tank storing magenta (M) ink, an ink tank storing yellow (Y) ink, and an ink tank storing black (B) ink are mounted in the ink tank unit 14.

Note that the ink tank 224 includes the non-volatile type memory 225 (see FIG. 2) in which ink tank information, additional information, etc., are stored as information related to a consumable part. The ink tank information is information indicating the type of ink tank corresponding to information related to a contract (which is described later). The additional information is, for example, information related to an ink color or a serial number for identifying the ink tank 224. Note that "non-volatile type memory" is also referred to as "non-volatile memory" in the present specification.

The ink supply unit 15 is disposed in the midstream of a flow path connecting each ink tank 224 mounted in the ink tank unit 14 and the print head 8, so as to adjust the pressure and the flow rate of ink inside the print head 8 within a suitable range. The present embodiment adopts a circulation type ink supply system, in which the ink supply unit 15 adjusts the pressure of ink supplied to the print head 8 and the flow rate of ink collected from the print head 8 within a suitable range. The maintenance unit 16 includes the cap unit 10 and the wiping unit 17, and the maintenance unit 16 operates the cap unit 10 and the wiping unit 17 at predetermined timings, so as to perform a maintenance operation for the print head 8.

Figure 2:
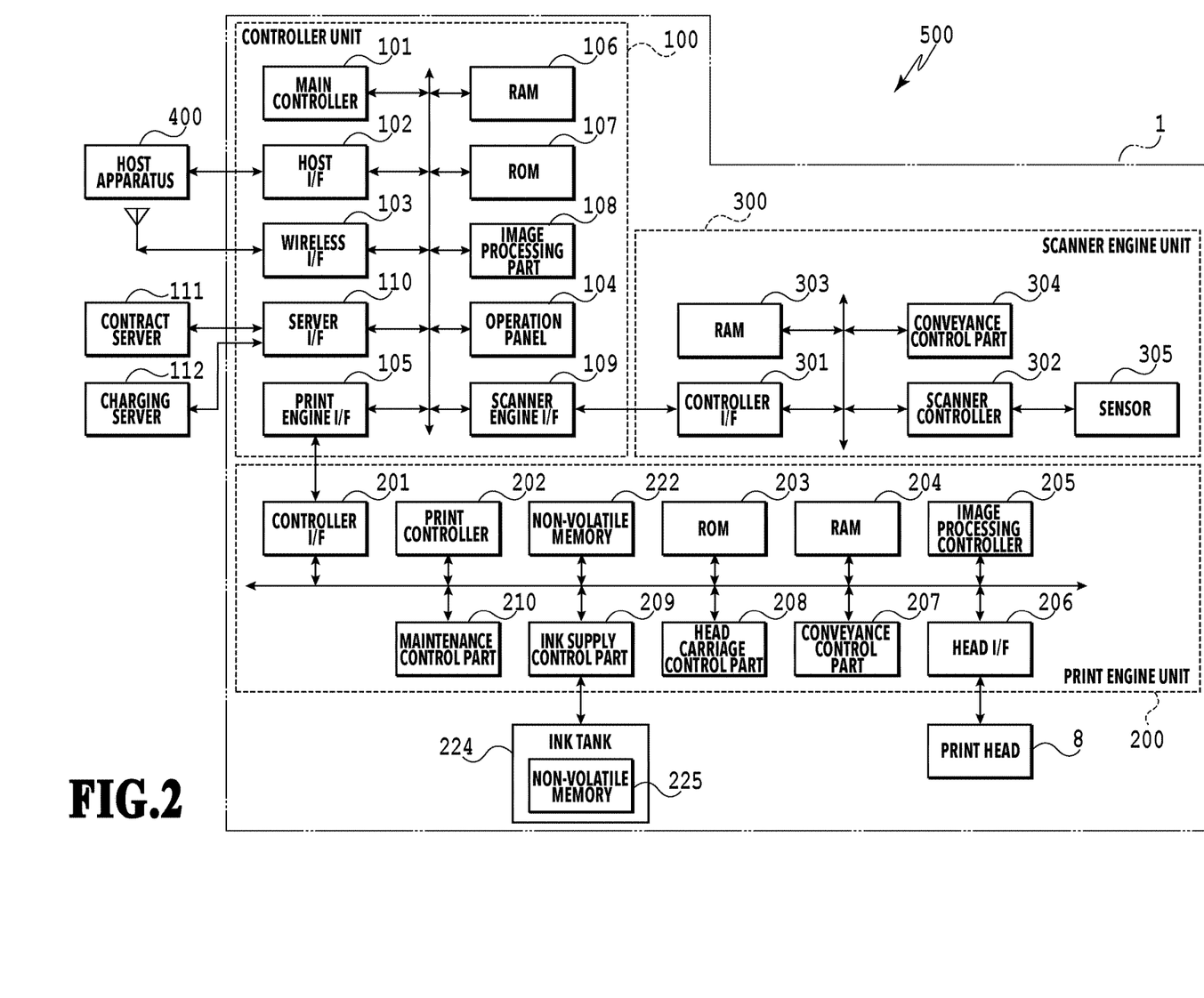
FIG. 2 is a block configuration diagram of an ordering system mainly illustrating a control configuration of the printing apparatus.

FIG. 2 is a block diagram illustrating a control configuration of the printing apparatus 1. The control configuration mainly includes the print engine unit 200 that exercises control over the print part 2, the scanner engine unit 300 that exercises control over the scanner part 3, and the controller unit 100 that exercises control over the entire printing apparatus 1. The print controller 202 controls various kinds of mechanisms of the print engine unit 200 in accordance with instructions from the main controller 101 of the controller unit 100. Various kinds of mechanisms of the scanner engine unit 300 are controlled by the main controller 101 of the controller unit 100. The control configuration is explained below in detail.

In the controller unit 100, the main controller 101, which is configured with a CPU, controls the entire printing apparatus 1 by using the RAM 106 as a work area in accordance with various kinds of parameters and a program stored in the ROM 107. For example, in a case where a print job is input from the host apparatus 400 via the host I/F 102 or the wireless I/F 103, the image processing part 108 performs predetermined image processing for received image data in accordance with instructions from the main controller 101. Then, the main controller 101 sends the image data, for which the image processing has been performed, to the print engine unit 200 via the print engine I/F 105. In the present embodiment, the color mode setting, i.e., setting of "monochrome" or "color", can be performed in a print job.

Note that the printing apparatus 1 may obtain image data from the host apparatus 400 via a wireless communication or a wired communication or may obtain image data from an external storage (such as a USB memory) connected to the printing apparatus 1. There is no limitation on the communication method utilized for the wireless communication or the wired communication. For example, Wi-Fi (Wireless Fidelity; registered trademark), Bluetooth (registered trademark), or the like is applicable as the communication method utilized for the wireless communication. Further, a USB (Universal Serial Bus) or the like is applicable as the communication method utilized for the wired communication. Moreover, for example, in a case where a scan command is input from the host apparatus 400, the main controller 101 sends this command to the scanner part 3 via the scanner engine I/F 109.

The operation panel 104 is a mechanism for the user to perform an input or output operation for the printing apparatus 1. Via the operation panel 104, the user can provide an instruction for an operation such as copying or scanning, set a print mode, recognize information about the printing apparatus 1, etc. In addition, the controller unit 100 includes the server I/F 110 which is connected to the contract server 111 and the charging server 112. The contract server 111 is a server that manages information related to a contract for the printing apparatus 1 (hereinafter referred to as "contract information"). The contract information includes the contract start date and time, the contract end date and time, the closing day of each month, and the like. The charging server 112 is a server that manages the charging amount to be charged to the user according to the use of the printing apparatus 1. In the present embodiment, the contract server 111 functions as a management apparatus that manages contract information.

In the print engine unit 200, the print controller 202, which is configured with a CPU, controls various kinds of mechanisms provided in the print part 2 while using the RAM 204 as a work area in accordance with various kinds of parameters and a program stored in the ROM 203. Once each kind of command and image data are received via the controller I/F 201, the print controller 202 temporarily saves the command and image data in the RAM 204. The print controller 202 causes the image processing controller 205 to convert the saved image data into print data, so as to be utilized by the print head 8 for a printing operation. After the print data is generated, the print controller 202 causes the print head 8 via the head I/F 206 to execute a printing operation based on the print data. Here, the print controller 202 drives the feeding units 6A and 6B, the conveyance rollers 7, the discharging rollers 12, and the flapper 11 illustrated in FIG. 1 via the conveyance control part 207, so as to convey the print medium S. The print operation by the print head 8 is executed in synchronization with the conveyance operation of the print medium S in accordance with an instruction from the print controller 202, such that the print processing is performed.

The head carriage control part 208 changes orientations and positions of the print head 8 in accordance with operating statuses of the printing apparatus 1 such as a maintenance status and a printing status. The ink supply control part 209 controls the ink supply unit 15 such that the pressure of the ink supplied to the print head 8 is controlled within a suitable range. The maintenance control part 210 controls operations of the cap unit 10 and the wiping unit 17 in the maintenance unit 16 in a case of performing a maintenance operation for the print head 8. Further, the print engine unit 200 is also equipped with the non-volatile memory 222 capable of storing a contract status or the like which is determined based on contract information transmitted from the contract server 111, for example.

In the scanner engine unit 300, the main controller 101 controls hardware resources of the scanner controller 302 while using the RAM 106 as a work area in accordance with various kinds of parameters and a program stored in the ROM 107. Accordingly, various kinds of mechanisms provided in the scanner part 3 are controlled. For example, the main controller 101 controls hardware resources in the scanner controller 302 via the controller I/F 301, so that a document placed on the ADF by the user is conveyed via the conveyance control part 304 and read by the sensor 305. Then, the scanner controller 302 saves the read image data in the RAM 303. Note that the print controller 202 is capable of converting such image data obtained as described above into print data to enable the print head 8 to execute a printing operation based on the image data read by the scanner controller 302.

Note that a program for implementing one or more functions of the printing apparatus 1 (controller unit, print engine unit, scanner engine unit) or the host apparatus 400 may be supplied to a system or an apparatus via a network or various kinds of printing media. Here, a computer (CPU, MPU, etc.) of this system or apparatus reads out the program and executes the function or causes various kinds of mechanisms to execute the function. Further, this program may be executed by one computer or may be implemented by multiple computers moving together. Moreover, it is not necessary to implement all of the above-described processes by software, and a part or all of the processes may be implemented by hardware such as an ASIC. Furthermore, the form is not limited to the one in which all processes are performed by one CPU, and there may be such a form in which multiple CPUs appropriately move together so as to perform the processes. Further, there may be such a form in which one CPU executes any of the processes and multiple CPUs move together so as to perform the other processes.

Figure 3:
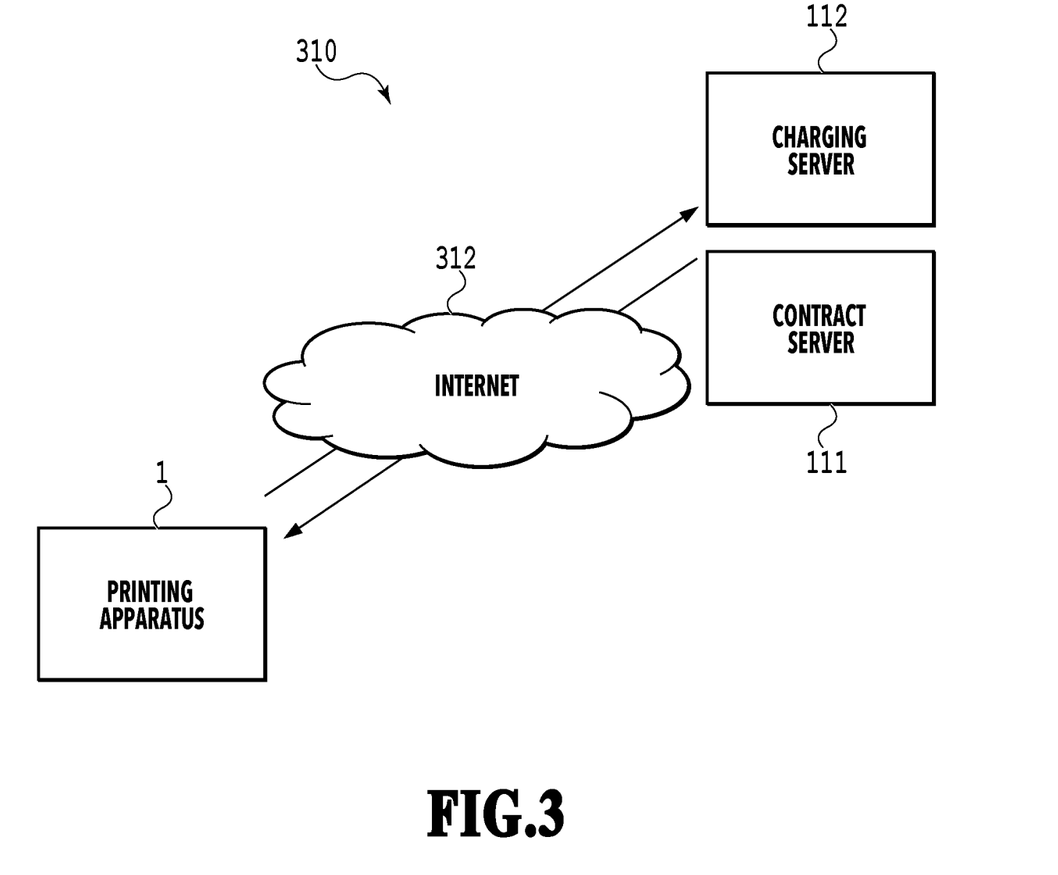
FIG. 3 is a schematic configuration diagram of a printing system.

FIG. 3 is a schematic configuration diagram of a printing system equipped with the printing apparatus 1. In the printing system 310 of FIG. 3, the printing apparatus 1 is connected to the contract server 111 and the charging server 112 via the Internet 312. The contract server 111 manages contract information of the printing apparatus 1 connected via the Internet 312. Further, the contract server 111 transmits contract information of the printing apparatus 1 to the printing apparatus 1 in response to a request from the printing apparatus 1. Specifically, the main controller 101 periodically requests the contract server 111 for contract information via the server I/F 110. The contract server 111 transmits contract information to the printing apparatus 1, based on the request from the main controller 101. The charging server 112 periodically receives information related to the number of printed sheets, which is the number of print media on which printing has been performed, etc., from the printing apparatus 1, in order to calculate the charging amount based on the received information.

Figure 4:
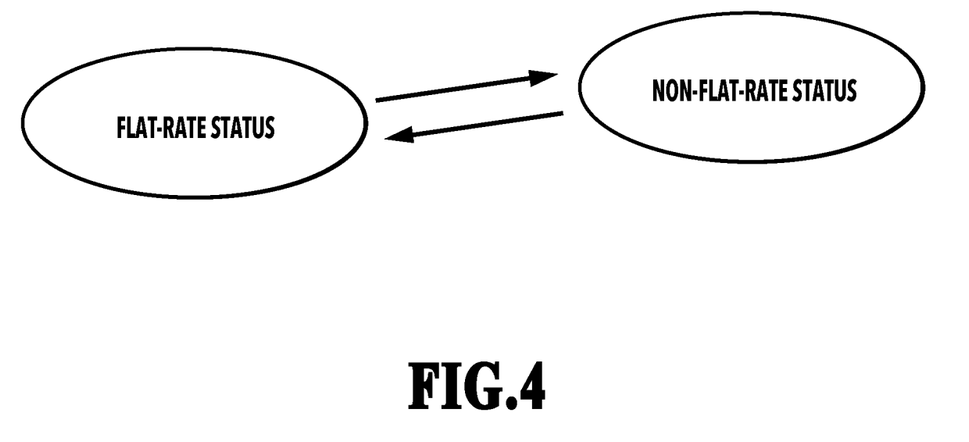
FIG. 4 is a diagram illustrating transitions of contract statuses of the printing apparatus.

In the printing system 310, the contract status of the printing apparatus 1 transitions between a flat-rate status and a non-flat-rate status. In the present embodiment, the flat-rate status is defined as a status in which a flat-rate contract is signed to receive a flat-rate service that does not incur costs for a consumable part by paying a flat-rate fee in every predetermined time period, and the non-flat-rate status is defined as a status in which a flat-rate contract is not signed so that costs for a consumable part occur. FIG. 4 is a diagram illustrating transitions of contract statuses of the printing apparatus. The printing apparatus 1 in a flat-rate status periodically receives contract information from the contract server 111 via the server I/F 110. Further, based on the received contract information, whether the contract status is a flat-rate status or non-flat-rate status is determined. If it is determined that the contract status is a flat-rate status, the flat-rate status is maintained. On the other hand, if it is determined that the contract status is a non-flat-rate status, shifting to the non-flat-rate status is performed. Further, regarding the printing apparatus 1 in a non-flat-rate status, if it is determined that the contract status is a flat-rate status, based on the contract information obtained from the contract server 111, shifting to the flat-rate status is performed. On the other hand, if it is determined that the contract status is a non-flat-rate status, the non-flat-rate status is maintained.

By the way, in printing apparatuses of publicly-known technologies, if the printing apparatus 1 is in a flat-rate status, ink tanks dedicated to the flat-rate service are mounted in the ink tank unit 14 for all the inks that can be used, and thereby printing can be performed. Hereinafter, "ink tank dedicated to a flat-rate service" is referred to as "flat-rate ink tank". Note that flat-rate ink tanks can be used only in a flat-rate status, in which a flat-rate service can be provided, and cannot be used in a non-flat-rate status. Therefore, if the contract period passed and the contract status has changed from a flat-rate status to a non-flat-rate status, it is necessary to change all of the ink tanks 224 mounted in the ink tank unit 14 to one-off type general-purpose ink tanks to be used in the non-flat-rate status. Hereinafter, "one-off type general-purpose ink tank" is referred to as "one-off ink tank". That is, in a non-flat-rate status, if even one flat-rate ink tank is mounted in the ink tank unit 14, printing will be restricted and become impossible. Accordingly, flat-rate ink tanks are prevented from improper use. However, it is a burden for the user to change all the ink tanks 224 from flat-rate ink tanks to one-off ink tanks after the contract status is changed from a flat-rate status to a non-flat-rate status.

Therefore, in the present embodiment, in a case where an ink tank corresponding to an ink used in the set color mode is a one-off ink tank in a non-flat-rate status, even though another ink tank is a flat-rate ink tank, printing in the color mode is exceptionally allowed. That is, in the printing apparatus 1 of the printing system 310, printing is allowed or restricted based on the contract status of the printing apparatus 1, the color mode which is set in the print job, and the mounted ink tanks 224. The details are explained below.

Figure 5:
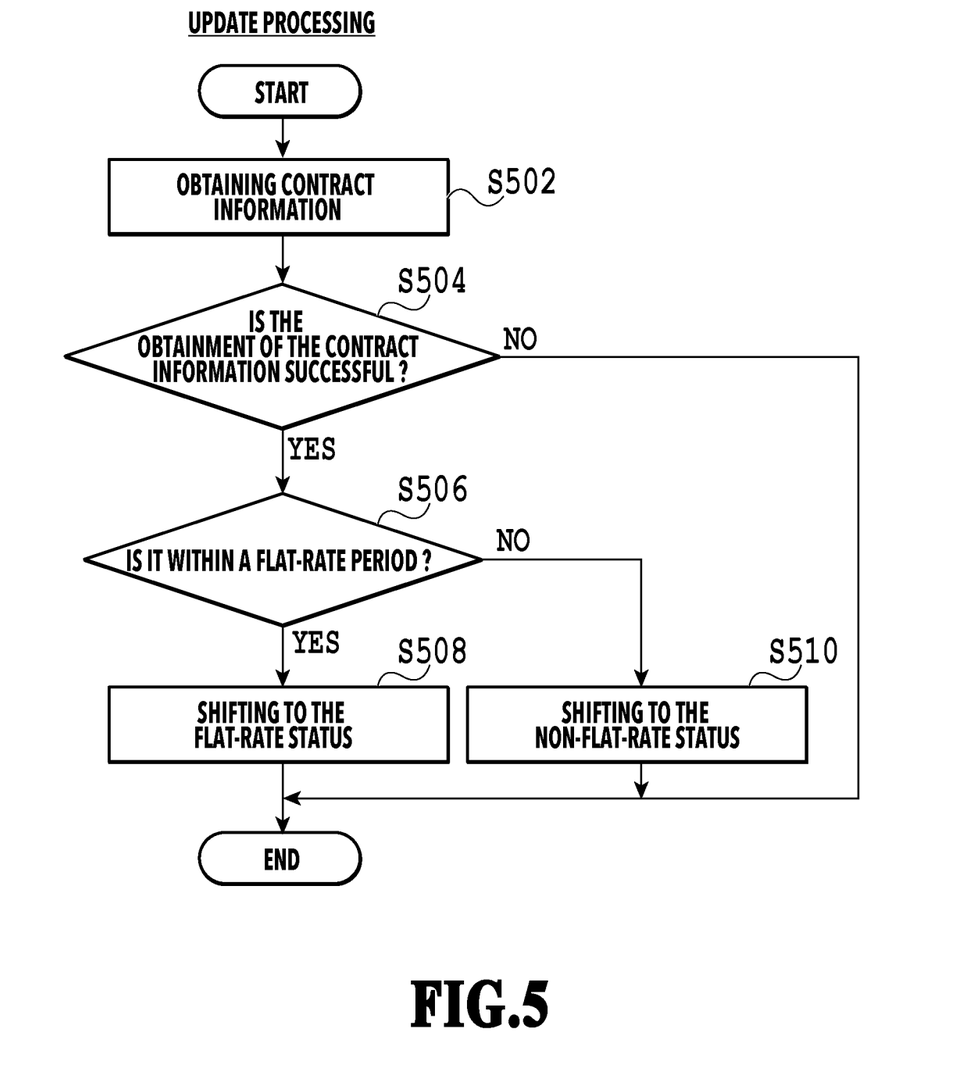
FIG. 5 is a flowchart illustrating processing contents of update processing.

In the printing system 310, update processing for updating the contract status of the printing apparatus 1 is executed at a predetermined timing. The predetermined timing is, for example, every predetermined time period or in a case where an instruction is provided via an operation from the operation panel 104 or the like. FIG. 5 is a flowchart illustrating detailed processing contents of the update processing. The series of processes illustrated in the flowchart of FIG. 5 is performed by the main controller 101 loading a program code stored in the ROM 107 into the RAM 106 and executing the program code. Alternatively, a part or all of the functions in the steps of FIG. 5 may be executed by hardware such as an ASIC or an electronic circuit. Note that the symbol "S" in the explanation of each process means that it is a step in the flowchart (the same applies hereinafter in the present specification).

If the update processing is started, the main controller 101 firstly obtains contract information from the contract server 111 (S502). In S502, the main controller 101 firstly requests the contract server 111 to transmit contract information of the printing apparatus 1. Based on this request, the contract server 111 transmits the requested contract information of the printing apparatus 1 to the printing apparatus 1. The printing apparatus 1 receives the contract information transmitted from the contract server 111 via the server I/F 110.

Next, whether or not the obtainment of the contract information is successful is determined (S504). In S504, for example, in a case where the contract information cannot be obtained even after a predetermined time period passes, it is determined that the contract information cannot be obtained. If it is determined in S504 that the contract information cannot be obtained, this update processing ends. Noted that, if the update processing cannot be performed, a configuration equipped with a notification function such as the operation panel 104 may provide a notification that the contract status cannot be updated. Note that the obtained contract information may be stored in a storage area such as the non-volatile memory 222.

Further, if it is determined in S504 that the obtainment of the contract information is successful, the main controller 101 determines, based on the contract information, whether or not the printing apparatus 1 is within a flat-rate period during which a flat-rate service is provided (S506). The contract information of the printing apparatus 1 includes the start date and time of the contract for receiving the flat-rate service (contract start date and time) and the end date and time of the contract (contract end date and time). Further, the controller unit 100 is also equipped with a clock (not illustrated in the drawings) from which the current date and time can be obtained. Therefore, in S506, based on the contract start date and time and contract end date and time of the contract information and the current date and time based on the above-described clock, whether or not the printing apparatus 1 is within the flat-rate period is determined.

Figure 6:
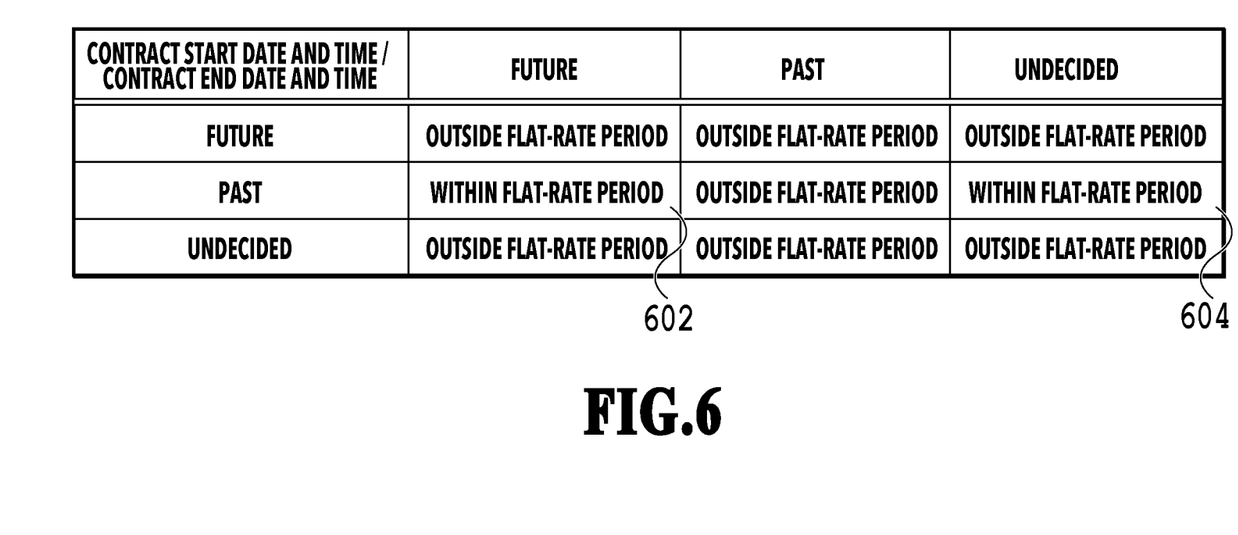
FIG. 6 is a table illustrating combinations of contract start date and time and contract end date and time which are determined to be within a flat-rate period.

The determination in S506 is specifically explained as follows. If the date and time (the current point in time) of executing the update processing is after the contract start date and time and before the contract end date and time, i.e., in a case of: the contract start date and time≤the current point in time<the contract end date and time, it is determined to be within the contract period. FIG. 6 is a table illustrating combinations of contract start date and time and contract end date and time which are determined to be within a flat-rate period. Note that, in FIG. 6, the contract start dates and times and the contract end dates and times are indicated as "PAST" and "FUTURE" with reference to the current point in time as the starting point, and the case of being unset or being set as undecided is indicated as "UNDECIDED". In FIG. 6, regarding the contract start dates and times and the contract end dates and times, it is assumed that the dates and times before the current point in time are defined as "PAST", and the dates and times after the current point in time are defined as "FUTURE".

In S506, the main controller 101 determines whether the date and time in which this update processing is being executed is after the contract start date and time as well as before the contract end date and time. Further, if it is determined that the date and time in which this update processing is being executed is after the contract start date and time as well as before the contract end date and time, it is determined to be within a flat-rate period. That is, if the contract start date and time is in the past and the contract end date and time is in the future, it is determined to be within a flat-rate period (see reference numeral 602 in FIG. 6).

On the other hand, if it is determined that the date and time in which the update processing is being executed is before the contract start date and time (date and time in which the update processing is being executed<contract start date and time) or equal to or after the contract end date and time (contract end date and time≤date and time in which the update processing is being executed), it is determined not to be within a flat-rate period. That is, if the contract start date and time is in the future, it is determined not to be within a flat-rate period, regardless of the contract end date and time. Further, if the contract end date and time is in the past, it is determined not to be within a flat-rate period, regardless of the contract start date and time.

Furthermore, the contract start date and time and the contract end date and time may be undecided. In this case, if the contract start date and time is undecided, it is determined not to be within a flat-rate period, regardless of the contract end date and time. Further, if the contract start date and time is in the past and the contract end date and time is undecided, it is determined to be within a flat-rate period (see reference numeral 604 in FIG. 6).

Returning to FIG. 5, if it is determined in S506 that the printing apparatus 1 is within a flat-rate period, the status shifts to the flat-rate status (S508), and this update processing ends. In S508, in a case of being in a flat-rate status at the point in time in which this updating processing is being performed, the printing apparatus 1 maintains the flat-rate status, and, in a case of being in a non-flat-rate status, the printing apparatus 1 shifts to the flat-rate status. Specifically, "flat-rate status" is stored in the non-volatile memory 222 as the contract status. Further, if it is determined in S506 that the printing apparatus 1 is not within a flat-rate period, the status shifts to the non-flat-rate status (S510), and this update processing ends. In S510, in a case of being in a flat-rate status at the point in time in which this updating processing is being performed, the printing apparatus 1 shifts to the non-flat-rate status, and, in a case of being in a non-flat-rate status, the printing apparatus 1 maintains the non-flat-rate status. Specifically, "non-flat-rate status" is stored in the non-volatile memory 222 as the contract status. As described above, in the present embodiment, the main controller 101 functions as a setting unit for setting contract status based on contract information.

Figure 7A:
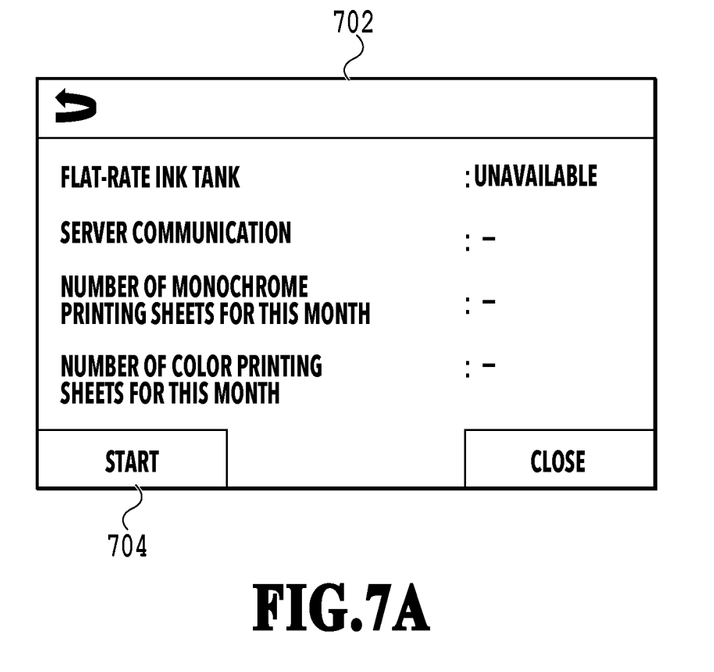
FIGS. 7A and 7B are diagrams illustrating display screens displayed on an operation panel.
Figure 7B:
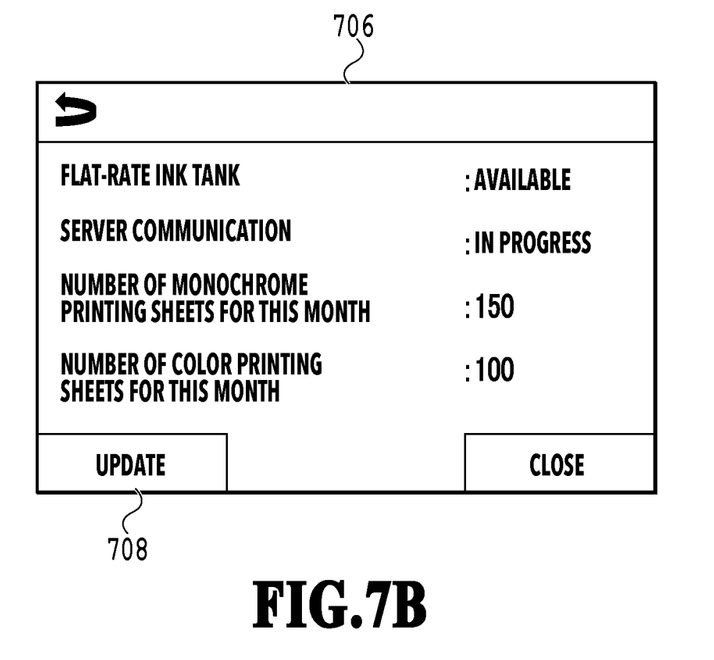

In the non-volatile memory 222, the stored contract status is updated to a new contract status. Accordingly, in the printing apparatus 1, the contract status is periodically updated to the latest contract status. Further, in the printing apparatus 1, a part of the display screen on the operation panel 104 changes based on the contract status held in the non-volatile memory 222. In FIG. 7A and FIG. 7B, display screens on the operation panel are illustrated. An example of a display screen in a non-flat-rate status is illustrated in FIG. 7A, and an example of a display screen in a flat-rate status is illustrated in FIG. 7B.

On the display screen 702 in the non-flat-rate status, a screen indicating that a flat-rate ink tank cannot be used is displayed. Further, if the start button 704 on the display screen 702 is pressed, the update processing is started. Moreover, the fields corresponding to "SERVER COMMUNICATION" which indicates the communication status of the server communication, "NUMBER OF MONOCHROME PRINTING SHEETS" which indicates the number of monochrome printing sheets for this month, and "NUMBER OF COLOR PRINTING SHEETS" which indicates the number of color printing sheets for this month are not displayed as "-". On the other hand, on the display screen 706 in a flat-rate status, a screen indicating that a flat-rate ink tank can be used, that the server communication is in progress, the specific number of monochrome printing sheets, and the specific number of color printing sheets is displayed. Further, if the update button 708 on the display screen 706 is pressed, the update processing is started.

Figure 8:
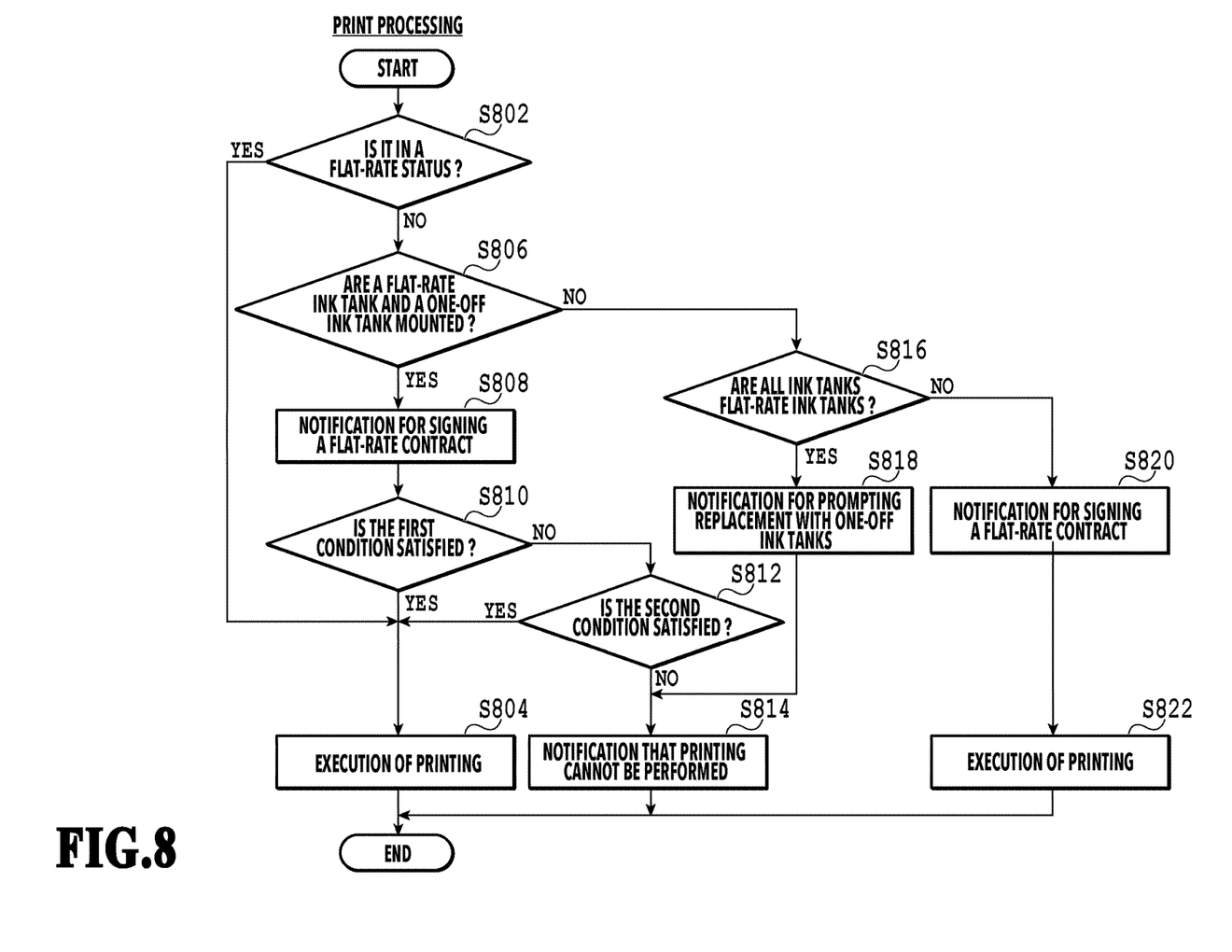
FIG. 8 is a flowchart illustrating processing contents of print processing.

In the printing apparatus 1, if a print job is input and the start of printing is instructed, print processing is started. Specifically, if an instruction for starting printing is input from the operation panel 104 or the like, the main controller 101 receives the instruction, and the main controller 101 instructs the print controller 202 to start the print processing. FIG. 8 is a flowchart illustrating detailed processing contents of the print processing. The series of processes illustrated in the flowchart of FIG. 8 is performed by the print controller 202 loading a program code stored in the ROM 203 into the RAM 204 and executing the program code. Alternatively, a part or all of the functions in the steps of FIG. 8 may be executed by hardware such as an ASIC or an electronic circuit.

If the print processing is started, the print controller 202 firstly determines whether or not the contract status is a flat-rate status (S802). In S802, whether or not the latest contract status stored in the non-volatile memory 222 is a flat-rate status is determined. If it is determined to be in a flat-rate status in S802, the print controller 202 executes printing based on the print job (S804) and ends this print processing. Note that, since various publicly-known technologies can be applied to the printing executed in S804, detailed explanation thereof is omitted.

Further, if it is determined not to be in a flat-rate status in S802, the print controller 202 determines whether or not a flat-rate ink tank and a one-off ink tank are mounted in the ink tank unit 14 (S806). The non-volatile memory 225 of the ink tank 224 stores ink tank information indicating the type of ink tank (flat-rate ink tank or one-off ink tank) corresponding to the contract information. Therefore, in S806, the print controller 202 makes the determination by obtaining the ink tank information of each ink tank 224 via the ink supply control part 209. If it is determined in S806 that a flat-rate ink tank and a one-off ink tank are mounted, the print controller 202 provides a notification for prompting signing of a flat-rate contract (S808). In S808, the print controller 202 requests the main controller 101 via the controller I/F 201 and the print engine I/F 105 to prompt signing of a flat-rate contract, i.e., to provide a notification for prompting shifting to a flat-rate contract. In response to the request, the main controller 101 uses a configuration equipped with a notification function, such as the host apparatus 400 or the operation panel 104, to provide the notification for prompting signing of a flat-rate contract. In the present embodiment, the configuration equipped with the notification function, such as the host apparatus 400 or the operation panel 104, functions as a notification unit capable of providing a notification of various types of information.

Next, the print controller 202 determines whether or not the first condition that a one-off ink tank is mounted for K ink and the color mode setting is monochrome is satisfied (S810). The non-volatile memory 225 of the ink tank 224 stores ink tank information as well as additional information including information related to the color of ink. There, in S810, the print controller 202 obtains the additional information of each ink tank 224 via the ink supply control part 209 to identify the ink tank 224 for K ink. Further, the ink tank information of the identified ink tank 224 is obtained, so that whether or not to be a one-off ink tank is determined. Further, monochrome or color is set as the color mode in the print job. Therefore, in S810, the print controller 202 refers to the color mode setting of the print job and determines whether or not the color mode setting is "monochrome". As described above, in the present embodiment, the print controller 202 functions as an obtainment unit that obtains the set color mode and also functions as an obtainment unit that obtains the type of ink tank corresponding to the contract status.

If it is determined in S810 that the first condition that a one-off ink tank is mounted for K ink and the color mode setting is monochrome is satisfied, the processing proceeds to S804, so that the printing based on the print job is executed. That is, printing based on the print jobs is allowed. Further, if it is determined in S810 that the first condition is not satisfied, whether or not the second condition that a one-off ink tank is mounted for each of C ink, Mink, and Y ink and the color mode setting is color is satisfied is determined (S812). In S812, the print controller 202 obtains the additional information of each ink tank 224 via the ink supply control part 209 to identify the ink tank 224 for each of C ink, M ink, and Y ink. Then, the print controller 202 obtains the ink tank information of each of the identified ink tanks 224 via the ink supply control part 209 and determines whether or not each of the ink tanks 224 is a one-off ink tank. Further, by referring to the color mode setting of the print job, whether or not the color mode setting is "color" is determined.

If it is determined in S812 that the second condition that a one-off ink tank is mounted for each of C ink, M ink, and Y ink and the color mode setting is color is satisfied, the processing proceeds to S804, so that the printing based on the print job is executed. That is, printing based on the print jobs is allowed. Further, if it is determined in S812 that the second condition is not satisfied, the print controller 202 provides a notification that the printing based on the input print job cannot be executed (S814) and ends this print processing. That is, the printing based on the print job is restricted. In S814, the print controller 202 requests the main controller 101 via the controller I/F 201 and print engine I/F 105 to provide a notification that the printing based on the input print job cannot be executed. In response to the request, the main controller 101 uses a configuration equipped with a notification function, such as the operation panel 104, to provide the notification that the printing based on the input print job cannot be executed.

As described above, in the present embodiment, the print controller 202 functions as a print control unit that allows or restricts printing and controls the printing based on the contract status, the set color mode, and the type of ink tank 224.

On the other hand, if it is determined in S806 that the condition that a flat-rate ink tank and a one-off ink tank are mounted is not satisfied, it is determined that only one of the ink tanks is mounted. Further, the print controller 202 determines whether or not all of the mounted ink tanks are flat-rate ink tanks (S816). If it is determined in S816 that all of the mounted ink tanks are flat-rate ink tanks, a notification for prompting replacement of the mounted ink tanks with one-off ink tanks is provided (S818), and the processing proceeds to S814. In S818, the print controller 202 requests the main controller 101 to provide the notification for prompting replacement of the flat-rate ink tanks mounted in the ink tank unit 14 with one-off ink tanks. In response to the request, the main controller 101 uses a configuration equipped with a notification function, such as the operation panel 104, to provide the notification for prompting the replacement with one-off ink tanks.

Further, if it is determined in S816 that none of the mounted ink tanks are flat-rate ink tanks, i.e., all of the ink tanks are one-off ink tanks, a notification for prompting signing of a flat-rate contract is provided (S820). Furthermore, the print controller 202 executes printing based on the print job (S822) and ends this print processing. The specific processing contents of S820 are the same as those of S808, and the specific processing contents of S822 are the same as those of S804.

As explained above, the printing system 310 periodically updates the contract status of the printing apparatus 1. Furthermore, before executing printing, the printing apparatus 1 exceptionally allows printing in a non-flat-rate status, based on the contract status, the color mode, and the type of ink tank 224, even though a flat-rate ink tank is mounted. Specifically, in a non-flat-rate status, if a condition that an ink tank corresponding to an ink to be used for printing in the set color mode is a one-off ink tank is satisfied, the printing is allowed even though an ink tank corresponding to another ink is a flat-rate ink tank. Further, if the above-described condition is not satisfied, the printing is restricted.

Accordingly, in the printing system 310, in a case where the contract status is changed from a flat-rate status to a non-flat-rate status, it is not necessary to execute the replacement of the corresponding ink tanks 224 for all the inks. Therefore, the burden on the user is reduced in printing after the contract status is changed. Further, printing can be performed with replacement of the minimum number of ink tanks 224, which improves user convenience.

Second Embodiment

Figure 9:
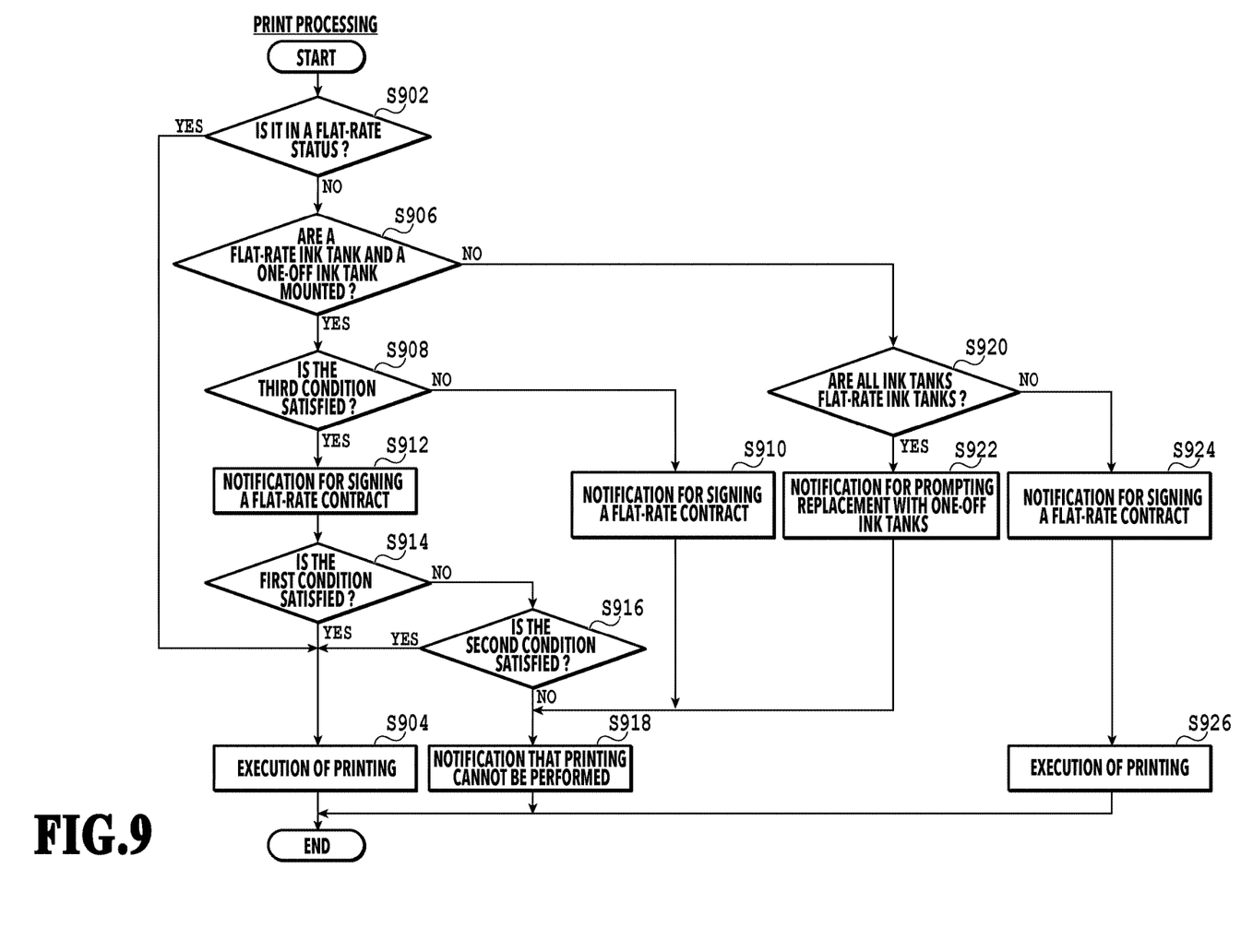
FIG. 9 is a flowchart illustrating processing contents of print processing of another embodiment.

Next, with reference to FIG. 9, the printing apparatus according to the second embodiment is explained. Note that, in the following explanation, the same or corresponding configurations as those of the printing apparatus according to the first embodiment described above are assigned with the same signs as those used in the first embodiment, so as to omit detailed explanations thereof.

The second embodiment is different from the above-described first embodiment in the aspect that, in a case where a flat-rate ink tank and a one-off ink tank are mounted in a non-flat-rate status, if a flat-rate ink tank has never been mounted in a flat-rate status in the past, printing is restricted.

In the present embodiment, the print controller 202 saves ink tank information obtained via the ink supply control part 209, i.e., the type of ink tank (flat-rate ink tank, one-off ink tank) corresponding to the contract information, as well as additional information in a storage area such as the ROM 203. The saved information is held as a log of the types of ink tanks that have been mounted in the past. In the present embodiment, the storage area such as the ROM 203 functions as a holding unit that holds a log of the types of ink tanks that have been mounted in the past.

FIG. 9 is a flowchart illustrating detailed processing contents of the print processing performed by the printing apparatus according to the second embodiment. The series of processes illustrated in the flowchart of FIG. 9 is performed by the print controller 202 loading a program code stored in the ROM 203 into the RAM 204 and executing the program code. Alternatively, a part or all of the functions in the steps of FIG. 9 may be executed by hardware such as an ASIC or an electronic circuit.

If the print processing is started, the print controller 202 firstly determines whether or not the contract status is a flat-rate status (S902). If it is determined to be in a flat-rate status in S902, the print controller 202 executes printing based on the print job (S904) and ends this print processing. Further, if it is determined not to be in a flat-rate status in S902, the print controller 202 determines whether or not a flat-rate ink tank and a one-off ink tank are mounted in the ink tank unit 14 (S906). The specific processing contents of S902, S904, and S906 are the same as those of S802, S804, and S806, respectively.

If it is determined in S906 that a flat-rate ink tank and a one-off ink tank are mounted, whether or not the third condition that a flat-rate ink tank has been mounted in a flat-rate status in the past is satisfied is determined (S908). In S908, the print controller 202 makes the determination by referring to the log of the types of ink tanks that have been mounted in the past, which is stored in a storage area such as the ROM 203.

If it is determined in S908 that the third condition that a flat-rate ink tank has been mounted in a flat-rate status in the past is not satisfied, the print controller 202 provides a notification for prompting signing of a flat-rate contract (S910), and the processing proceeds to S918, which is described later. Further, if it is determined in S908 that the third condition is satisfied, the print controller 202 provides a notification for prompting signing of a flat-rate contract (S912). The specific processing contents of S910 and S912 are the same as those of S808.

Thereafter, the print controller 202 determines whether or not the first condition that a one-off ink tank is mounted for K ink and the color mode setting is monochrome is satisfied (S914). If it is determined in S914 that the first condition is satisfied, the processing proceeds to S904. Further, if it is determined in S914 that the first condition is not satisfied, whether or not the second condition that a one-off ink tank is mounted for each of C ink, M ink, and Y ink and the color mode setting is color is satisfied is determined (S916). If it is determined in S916 that the second condition is satisfied, the processing proceeds to S904. Further, if it is determined in S916 that the second condition is not satisfied, the print controller 202 provides a notification that the printing based on the input print job cannot be executed (S918) and ends this print processing. The specific processing contents of S914 to S916 are the same as those of S808 to S812 described above.

Further, if it is determined in S906 that the condition that a flat-rate ink tank and a one-off ink tank are mounted is not satisfied, it is determined that only one of the ink tanks is mounted. Further, the print controller 202 determines whether or not all of the mounted ink tanks are flat-rate ink tanks (S920). If it is determined in S920 that all of the mounted ink tanks are flat-rate ink tanks, a notification for prompting replacement of the mounted ink tanks with one-off ink tanks is provided (S922), and the processing proceeds to S918.

Further, if it is determined in S920 that none of the mounted ink tanks are flat-rate ink tanks, i.e., all of the ink tanks are one-off ink tanks, a notification for prompting signing of a flat-rate contract is provided (S924). Then, the print controller 202 executes printing based on the print job (S926) and ends this print processing. The specific processing contents of S920 to S926 are the same as those of S816 to S822 described above.

As explained above, in the printing system 310 according to the present embodiment, in addition to the configuration of the printing system 310 according to the first embodiment, a log of the types of ink tanks that have been mounted in the past is created in a storage area. Further, whether or not the third condition that a flat-rate ink tank has been mounted in a flat-rate status in the past is satisfied is determined, and, if the third condition is satisfied, printing is controlled to be allowed or restricted based on the first condition and the second condition. Accordingly, regarding a printing apparatus on which a flat-rate ink tank has never been mounted in a situation where the contract status is a flat-rate status, i.e., a printing apparatus that has never been provided with a flat-rate service, it is possible to restrict the use of flat-rate ink tanks for which the acquisition route is unknown. Therefore, in the present embodiment, in addition to the functional effects of the above-described first embodiment, it is possible to prevent improper use of a flat-rate ink tank.

OTHER EMBODIMENTS

Note that the above-described embodiments may be modified as shown in the following (1) through (8).

(1) Although, in the above-described embodiments, if it is determined that the second condition is not satisfied, the notification that printing based on the input print job cannot be executed is provided and then the print processing ends, there is not a limitation as such. For example, after providing the above-described notification, a notification for prompting replacement of the ink tank 224 for the ink used for printing in the color mode of the print job with a one-off ink tank is provided. Then, if the replacement with the one-off ink tank is completed, the processing that follows may be executed by returning to the processing for determining whether or not to be in a flat-rate status.

(2) Although the printing is executed if the ink tank for K ink is a one-off ink tank in a case where the color mode is set to "monochrome", there is not a limitation as such. It is also possible to perform printing by expressing "monochrome" with C ink, M ink, and Y ink. Therefore, if the color mode is set to "monochrome", not only in a case where the ink tank for K ink is a one-off ink tank but also where the ink tanks for C, M, and Y ink are one-off ink tanks, respectively, the printing can be executed.

(3) Although, in the above-described embodiments, printing is allowed in a non-flat-rate status if the ink tank for the ink used for printing in the set color mode is a one-off ink tank even though the other ink tanks are flat-rate ink tanks, there is not a limitation as such. Note that one-off ink tanks can be used in contract statuses of both non-flat-rate status and flat-rate status. Therefore, in a flat-rate status, if the ink tank of the ink used for printing in the set color mode is a flat-rate ink tank, printing is allowed, and, if the ink tank is a one-off ink tank, replacement with a flat-rate ink tank may be recommended.

(4) Although the printing apparatuses 1 of the above-described embodiments are configured so that a flat-rate ink tank which can be used only in a flat-rate status and a one-off ink tank which can be used in a flat-rate status and a non-flat-rate status can be mounted, there is not a limitation as such. For example, such a configuration in which a flat-rate ink tank, a one-off ink tank, and a predetermined ink tank that can be used only in the non-flat-rate status can be mounted is also possible. Alternatively, as a configuration in which the contract status becomes a predetermined status other than the flat-rate status nor the non-flat-rate status, such a configuration in which a specific ink tank corresponding to the predetermined status only can be mounted in addition to a flat-rate ink tank and a one-off ink tank is also possible. In this case, in the print processing, the type of contract status is determined first. Thereafter, printing is allowed only in a case where the ink tank filled with ink to be used for printing in the set color mode is an ink tank of the type corresponding to the contract status.

(5) Although not specifically described in the above-described embodiments, in the print processing in a non-flat-rate status, a configuration in which a mode in which printing is allowed or restricted as in the above-described embodiments or a mode in which such allowing and restricting of printing are not performed can be selected is also possible. Note that, in the mode where such allowing and restricting of printing are not performed as in the above-described embodiments, for example, in a case where there is at least one flat-rate ink tank among the ink tanks mounted in the ink tank unit 14 in the non-flat-rate status, printing is restricted. Further, such mode setting may be executed using an input mechanism such as the operation panel 104 or may be performed with the print job.

(6) Although, in the second embodiment, the log of the types of ink tanks that have been mounted in the past is referred to in the case of determining in S908 whether or not a flat-rate ink tank has been mounted in a flat-rate status in the past, there is not a limitation as such. For example, each time a contract status stored in the non-volatile memory 222 is updated to a new contract status, the contract status before the update is added so that the log of the contract statuses in the past is saved in a storage area such as the non-volatile memory 222. Further, it is also possible that whether or not a flat-rate ink tank has been mounted in a flat-rate status in the past is determined based on the logo of the past contract statuses in the storage area. Note that the determination may be made based on both log of the types of ink tanks mounted in the past and log of the contract statuses in the past. That is, in a case where the log of the contract statuses in the past includes a flat-rate status and the log of the types of ink tanks that have been mounted in the past includes a flat-rate ink tank, it is determined that a flat-rate ink tank has been mounted in a flat-rate status in the past.

Further, if the log of the types of ink tanks that have been mounted in the past includes a flat-rate ink tank, it is also possible to determine whether or not the flat-rate ink tank is detached from the ink tank unit 14 after shifting to a non-flat-rate status. In this case, based on the ink tank information and additional information obtained via the ink supply control part 209, the print controller 202 monitors whether or not a flat-rate ink tank is detached after shifting to a non-flat-rate status, so as to hold the log of the detachment. If the flat-rate ink tank is not detached, the processing proceeds to S912. Further, if the flat-rate ink tank is detached, the processing proceeds to S910, so that printing is restricted. Accordingly, an improperly obtained flat-rate ink tank cannot be used even in the printing apparatus 1 that has been in the flat-rate contract in the past.

(7) Although, in the above-described embodiments, the main controller 101 and the print controller 202 of the printing apparatus 1 control allowance and restriction of printing, there is not a limitation as such. For example, it is also possible to connect an external apparatus such as a general-purpose personal computer to the printing apparatus 1 so that allowance and restriction of printing are controlled by the external apparatus. Further, although the above-described embodiments are configured so that the printing apparatus 1 is a printing apparatus that uses ink for printing and uses an ink tank filled with ink, which is a printing material, as a consumable part, there is not a limitation as such. For example, such a configuration with a printing apparatus that uses toner for printing and uses a toner cartridge filled with toner, which is a printing material, as a consumable part is also possible.

(8) The above-described embodiments and various kinds of forms shown in (1) through (7) may be combined as appropriate.

Embodiment(s) of the present disclosure can also be realized by a computer of a system or apparatus that reads out and executes computer executable instructions (e.g., one or more programs) printed on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-202432, filed Dec. 14, 2021, which is hereby incorporated by reference in its entirety.

What is claimed is:

1. A printing apparatus to which a consumable part filled with a printing material can be detachably attached, so as to perform printing according to a color mode setting by use of the printing material filled in the consumable part whose type differs according to a contract, the printing apparatus comprising:

a setting unit configured to set a contract status, based on information related to the contract;

a first obtainment unit configured to obtain a set color mode;

a second obtainment unit configured to obtain the type of mounted consumable part which corresponds to the contract status; and a print control unit configured to control printing by allowing or restricting the printing, based on the contract status that is set by the setting unit, the color mode that is obtained by the first obtainment unit, and the type of consumable part that is obtained by the second obtainment unit.

2. The printing apparatus according to claim 1,
wherein the contract status includes a first contract status and a second contract status, and
wherein, if the contract status is the second contract status, the print control unit
allows printing in a case where the consumable part filled with the printing material to be used for printing in the color mode is a consumable part corresponding to the second contract status and
restricts printing in a case where at least one of the consumable parts is a consumable part corresponding to the first contract status.

3. The printing apparatus according to claim 1 further comprising
a holding unit configured to hold at least one of a first log, which is a log of the contract status that is set by the setting unit, and a second log, which is a log of the type of consumable part that is obtained by the second obtainment unit,
wherein the print control unit controls printing by allowing or restricting the printing, based on at least one of the first log and the second log, the contract status that is set by the setting unit, the color mode that is obtained by the first obtainment unit, and the type of consumable part that is obtained by the second obtainment unit.

4. The printing apparatus according to claim 3,
wherein the contract status includes a first contract status and a second contract status, and
wherein, if the contract status is the second contract status, the print control unit
allows printing in a case of satisfying a first condition that: it is determined, based on at least one of the first log and the second log, that a consumable part corresponding to the first contract status has been mounted in the first contract status in a past; and the consumable part filled with the printing material to be used for printing in the color mode is a consumable part corresponding to the second contract status, and
restricts printing in a case where the first condition is not satisfied.

5. The printing apparatus according to claim 3,
wherein the holding unit further holds a third log, which is a log of attachment and detachment of the consumable part corresponding to the contract status, and
wherein the print control unit allows or restricts printing, based on at least one of the first log and the second log, the third log, the contract status that is set by the setting unit, the color mode that is obtained by the first obtainment unit, and the type of consumable part that is obtained by the second obtainment unit.

6. The printing apparatus according to claim 5,
wherein the contract status includes a first contract status and a second contract status,
wherein the third log is a log of attachment and detachment of a consumable part corresponding to the first contract status, and
wherein, if the control status is the second control status, the print control unit
allows printing in a case of satisfying a second condition that: it is determined, based on at least one of the first log and the second log, that the consumable part corresponding to the first contract status has been mounted in the first contract status in a past; it is determined, based on the third log, that the consumable part corresponding to the first contract status has not been attached or detached after shifting to the second contract status; and the consumable part filled with the printing material to be used for printing in the color mode is a consumable part corresponding to the second contract status, and
restricts printing in a case where the second condition is not satisfied.

7. The printing apparatus according to claim 2,
wherein the first contract status is a flat-rate status in which a flat-rate contract is signed by paying a flat-rate fee in every predetermined time period so that a cost for the consumable part does not occur, and
wherein the second contract status is a non-flat-rate status in which the flat-rate contract is not signed so that the cost for the consumable part occurs.

8. The printing apparatus according to claim 7,
wherein the information related to the contract includes a contract start date and time and contract end date and time of the flat-rate contract, and
wherein the setting unit sets the contract status as the flat-rate status only in a case where, with reference to a timing for performing printing as a starting point, the contract start date and time is in a past and the contract end date and time is in a future as well as the contract start date and time is in the past and the contract end date and time is undecided.

9. The printing apparatus according to claim 1,
wherein the printing apparatus is connected to a management apparatus that manages the contract, and
wherein the setting unit updates the contract status by obtaining the information related to the contract from the management apparatus periodically or based on an instruction for an update.

10. The printing apparatus according to claim 1,
wherein a mode in which printing is controlled by allowing or restricting the printing, based on information including the contract status that is set by the setting unit, the color mode that is obtained by the first obtainment unit, and the type of consumable part that is obtained by the second obtainment unit, or a mode in which the control is not performed can be selected.

11. The printing apparatus according to claim 1,
wherein the consumable part is an ink tank or a toner cartridge.

12. The printing apparatus according to claim 4 further comprising
a notification unit configured to be capable of providing a notification of various kinds of information,
wherein, in the second contract status, if the consumable part corresponding to the first contract status has not been mounted in the first status in the past, the notification unit provides a notification for prompting shifting to the first contract status.

13. The printing apparatus according to claim 6 further comprising
a notification unit configured to be capable of providing a notification of various kinds of information,
wherein, in the second contract status, if the consumable part corresponding to the first contract status has been attached or detached after shifting to the second contract status, the notification unit provides a notification for prompting shifting to the first contract status.

14. A printing method of a printing apparatus to which a consumable part filled with a printing material can be detachably attached, so as to perform printing according to a color mode setting by use of the printing material filled in the consumable part whose type differs according to a contract, the printing method comprising:
- setting a contract status, based on information related to the contract;
- obtaining a set color mode;
- obtaining the type of mounted consumable part which corresponds to the contract status; and
- allowing or restricting the printing, based on the set contract status, the obtained color mode, and the obtained type of consumable part.

15. A non-transitory computer readable storage medium storing a program for causing a computer to perform a printing method in which a consumable part filled with a printing material can be detachably attached, so as to perform printing according to a color mode setting by use of the printing material filled in the consumable part whose type differs according to a contract, the printing method comprising:
- setting a contract status, based on information related to the contract;
- obtaining a set color mode;
- obtaining the type of mounted consumable part which corresponds to the contract status; and
- allowing or restricting the printing, based on the set contract status, the obtained color mode, and the obtained type of consumable part.

* * * * *